(12) United States Patent
Rogalla et al.

(10) Patent No.: US 7,201,203 B2
(45) Date of Patent: Apr. 10, 2007

(54) CLAMPING DEVICE FOR RIMS, PARTICULARLY FOR MOUNTING TIRES

(75) Inventors: Martin Rogalla, Darmstadt (DE); Dieter Thelen, Modautal (DE); Werner Lehr, Modautal (DE)

(73) Assignee: Schenck RoTec GmbH, Darmstadt (DE)

( * ) Notice: Subject to any disclaimer, the term of this patent is extended or adjusted under 35 U.S.C. 154(b) by 25 days.

(21) Appl. No.: 10/537,505

(22) PCT Filed: Dec. 2, 2003

(86) PCT No.: PCT/DE03/03985

§ 371 (c)(1),
(2), (4) Date: Jun. 3, 2005

(87) PCT Pub. No.: WO2004/050393

PCT Pub. Date: Jun. 17, 2004

(65) Prior Publication Data

US 2006/0049616 A1    Mar. 9, 2006

(30) Foreign Application Priority Data

Dec. 4, 2002    (DE) ............................. 102 56 870

(51) Int. Cl.
*B60C 25/00*    (2006.01)
*B60C 25/05*    (2006.01)

(52) U.S. Cl. .......................................... 157/16; 157/21

(58) Field of Classification Search .................. 157/16, 157/21

See application file for complete search history.

(56) References Cited

U.S. PATENT DOCUMENTS

| 1,793,863 | A | | 2/1931 | Manley et al. |
| 1,850,053 | A | | 3/1932 | Stevens |
| 3,528,475 | A | * | 9/1970 | Duquesne .................. 157/1.24 |
| 4,093,006 | A | * | 6/1978 | Hessels ....................... 157/18 |
| 4,750,538 | A | * | 6/1988 | du Quesne ................. 157/1.24 |
| 6,039,104 | A | | 3/2000 | Gwaltney et al. |
| 6,062,289 | A | * | 5/2000 | Cunningham et al. ........ 157/16 |
| 2002/0162633 | A1 | | 11/2002 | Mimura |

FOREIGN PATENT DOCUMENTS

| DE | 42 07 982 | 9/1992 |
| GB | 789512 | 1/1958 |

* cited by examiner

*Primary Examiner*—David B Thomas
(74) *Attorney, Agent, or Firm*—Collard & Roe, P.C.

(57) ABSTRACT

In a device for clamping the rim of a vehicle wheel, in particular for mounting tires, comprising a shelf (35), onto which the rim may be deposited by one side, and comprising clamping jaws (12 to 15), which may be moved radially relative to the rim, for clamping the rim edge adjacent to the shelf (35), two pairs of clamping jaws (12 to 15), of which the paths of movement intersect at right angles, are provided. The movement of the clamping jaws (12 to 15) is generated by a cylinder (22) and is synchronized by means of a gear unit (27).

12 Claims, 2 Drawing Sheets

CLAMPING DEVICE FOR RIMS, PARTICULARLY FOR MOUNTING TIRES

CROSS REFERENCE TO RELATED APPLICATIONS

Applicant claims priority under 35 U.S.C. §119 of German Application No. DE 102 56 870.7 filed on Dec. 4, 2002. Applicant also claims priority under 35 U.S.C. §365 of PCT/DE2003/003985 filed on Dec. 2, 2003. The international application under PCT article 21(2) was not published in English.

The invention relates to a device for clamping the rim of a vehicle wheel, in particular for mounting tires, having a shelf, onto which the rim may be deposited by one side, and having clamping jaws, which are radially movable relative to the rim for clamping the rim bead adjacent to the shelf.

In order to mount a tire onto the rim of a vehicle wheel using a fitting machine, it is necessary to hold the vehicle wheel in position on the table of the fitting machine. While doing this, the applied holding forces have to be sufficiently great for the wheel to be held securely against the fitting forces that occur. The rim is clamped by clamping jaws, the rim axis being substantially vertical. The tire is deposited obliquely onto the clamped rim, a portion of its shoulder being held by a shelf at the level of the lower rim bead. A rotary tool first of all presses the first lower tire bead over the upper rim bead. The second tire bead is then pressed over the upper rim bead by means of a rotary tool. During this process the second tire bead has to slide into the drop base of the rim so that the second tire bead may be pressed over the upper rim bead without over-expanding. In some rims the drop base is approximately half way up the rim, so the tire has to be very markedly deformed during this stage of fitting. As the tire lying on the table cannot escape, this deformation may damage the tire.

The object of the invention is to configure a clamping device of the above-mentioned type in such a way that inadmissible deformation of the tire as is it mounted onto the rim is avoided.

According to the invention the object is achieved in that the clamping jaws have contact faces, which cooperate with the axial outer side of the rim bead, and clamping claws, which may be pressed against the rim bead radially from the exterior, and in that a free space extends in the axial and radial direction leading away from the rim on the back, turned away from the rim bead, of at least one clamping claw.

As a result of the configuration of the clamping device according to the invention, it is possible for the tire tread to escape under the rim support plane during mounting as a sufficiently great free space is provided directly behind the clamping jaws or clamping claws for receiving the deformed region of the tire. The formation of a bulge penetrating into the interior of the tire, which may damage the tire, is thus prevented. This is particularly important in tires known as run flat tires.

Clamping devices for automatic tire-fitting systems are known, in which the rim of the vehicle wheel is clamped on two opposing sides between clamping jaws, which are configured to correspond to the rim bead. This clamping method creates considerable bending moments in the rim bead, so that there is a risk of the vehicle wheel becoming permanently bent. In order to prevent this, the clamping forces of the clamping device have to be correspondingly low, and this conflicts with the requirement for secure holding of the disc wheel.

In order for the bending moments occurring on the rim or the vehicle wheel to remain low in comparison with the achievable holding force, it is provided, according to a further suggestion of the invention, that the clamping device comprises two pairs of clamping jaws, of which the paths of movement intersect, in particular at right angles, and that a drive, which synchronously moves the clamping jaws into a clamping position pressed against the rim of the vehicle wheel, is provided.

In the clamping device according to the invention, the clamping jaws act on four sides of the rim, and this considerably reduces the bending stress of the rim. Consequently greater clamping forces may be used for holding the rim, without over-stressing or permanently deforming the rim. A uniform distribution of the clamping force may also be aided in that the clamping jaws have clamping faces, which may be pressed against the rim at two mutually spaced points.

According to a further suggestion of the invention, it may be provided that the clamping jaws are mounted on a cross-shaped carrier by means of slides which are guided with minimal friction. In order to create sufficient free space at the back of the clamping jaws for tire movement during fitting of the tire, it is further suggested that the clamping jaws should be arranged on supports, which extend from the slides to a shelf located above the cross-shaped carrier. As a result of this, a free space that extends downward behind the clamping jaws is created, so that the tire may escape downward and is not bent during the mounting process.

The drive of the clamping jaws preferably comprises a gear unit having a rotatable disc, of which the rotational axis extends in the centre of the paths of movement of the clamping jaws and at right angles to the paths of movement, each clamping jaw being connected to the disc by a rod, the rod being connected to the clamping jaws and the disc by means of joints. Due to this configuration of the drive a synchronized movement of the clamping jaws is achieved in a simple way. The elasticity of the components which transfer the clamping force, in conjunction with the elasticity of the clamped rim, ensures a uniform distribution of the clamping force onto the individual clamping jaws. For precise adjustment of the synchronized movement of the clamping jaws, the length of the individual rods of the drive may be adjustable.

According to a further suggestion of the invention the clamping jaws may comprise a clamping claw, which overlaps the rim bead, and a support face, which is situated in the plane of the support and on which the rim lies in the clamped position. As a result of this, the rim is held in the clamped position exclusively by the clamping jaws. The support, on which the vehicle wheel is deposited before clamping, does not therefore have to absorb any holding forces during fitting of the tire.

In a further advantageous embodiment of the invention, the shelf may comprise at least two mutually spaced parallel flexible belts, which are guided on the clamping jaws of one pair by means of deflecting pulleys and are attached to the cross-shaped carrier by their ends. Preferably the flexible belts are thereby guided over first deflecting pulleys, arranged before the clamping jaws, and are deflected on the first deflecting pulleys in the direction of the cross-shaped carrier. The belts are then also guided over second deflecting pulleys that are arranged between the shelf plane and the cross-shaped carrier, and are deflected by said deflecting pulleys into a plane that is parallel to the shelf plane, and contains the points for attaching the belts on the cross-shaped carrier.

The configuration of the shelf according to the invention has the advantage that it adapts to different positions of the clamping jaws, so the clamping device may be used for a wide range of rim diameters. The belts remain at rest while the clamping jaws are moving, so that the vehicle wheels located on the shelf do not have to slide during the clamping movement and hence cannot be scratched. It has also proven to be advantageous that the rim makes no sound when it is put down on the belts and, as a result of the damping effect of the belts, does not bounce up from the shelf face. Owing to the deflection of the flexible belts by means of the deflecting pulleys, which are arranged on the clamping jaws, the shelf does not extend beyond the clamping jaws at the back. Consequently the desired free space for the fitting process is not restricted by parts of the shelf.

In order to relieve the flexible belts of the shelf, supports on which the flexible belts rest may be arranged centrally between the clamping jaws on the cross-shaped carrier.

In order to move the clamping jaws and to generate the clamping force, an advantageous configuration of the invention provides for a hydraulic or pneumatically driven cylinder, of which the cylinder housing is connected to the support of one clamping jaw and of which the piston rod is connected to the support of the other clamping jaw, to be arranged underneath the shelf plane between the supports of two opposing clamping jaws. The clamping movement and the clamping force generated by the cylinder is transferred onto the other two clamping jaws, which are not connected to the cylinder, by means of the gear unit, which connects the two clamping jaws and synchronizes their movement.

The invention will be described in greater detail below with reference to an embodiment, which is illustrated in the drawings, in which.

Figure 1:
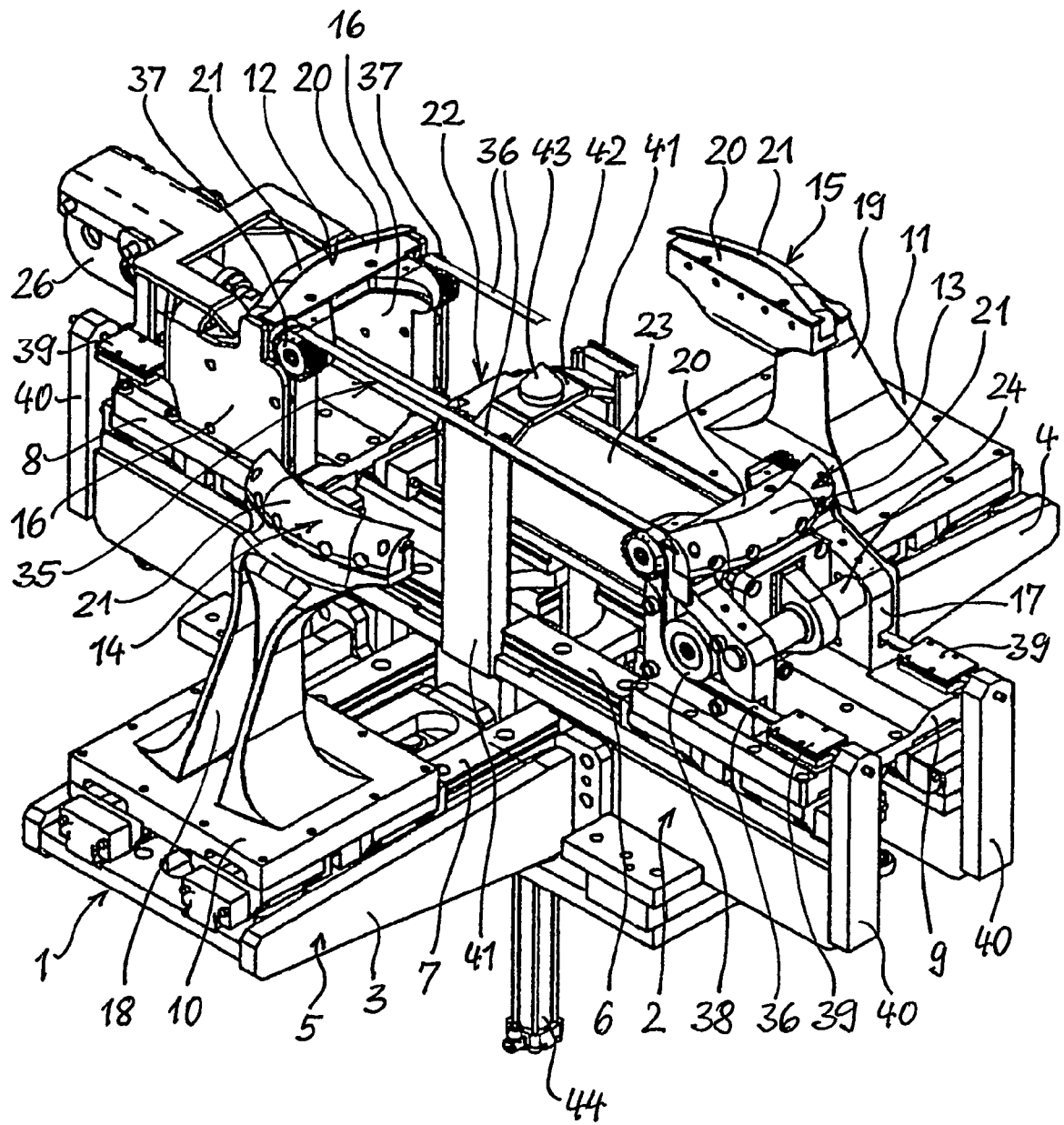
FIG. 1 is a perspective view of a clamping device for clamping motor vehicle wheels.
Figure 2:
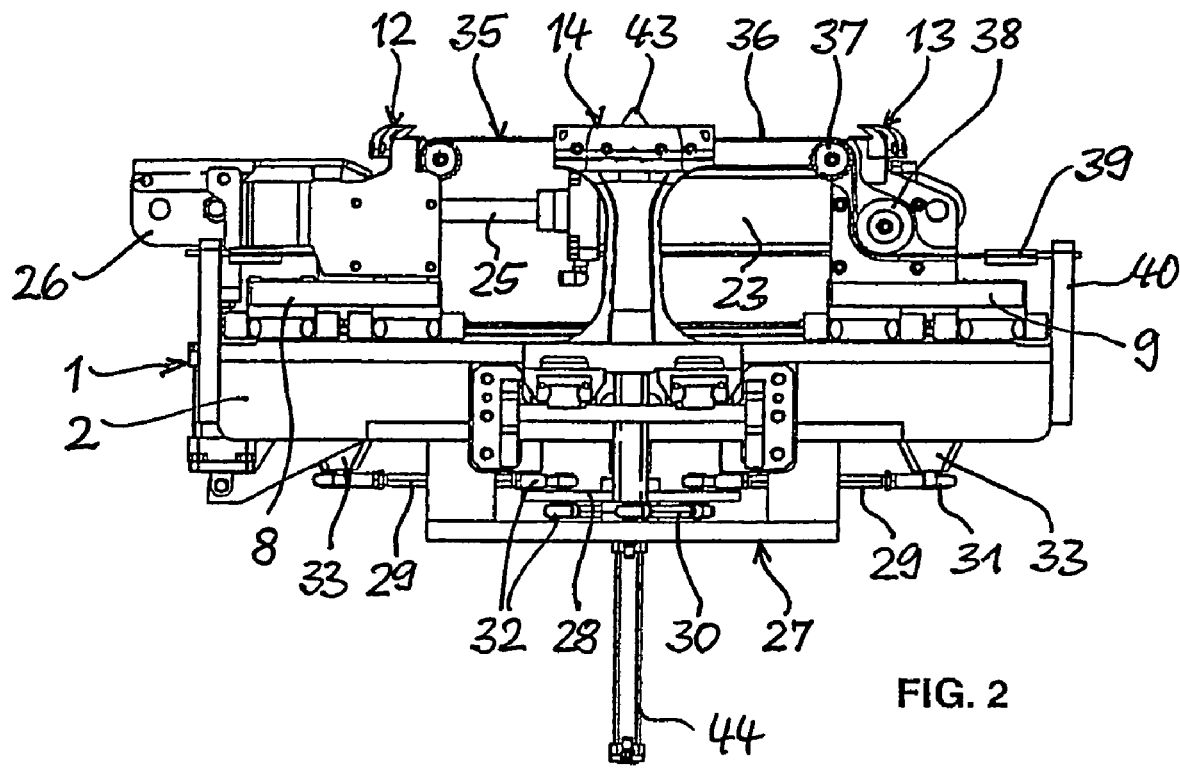
FIG. 2 is a first side view of the clamping device according to FIG. 1.
Figure 3:
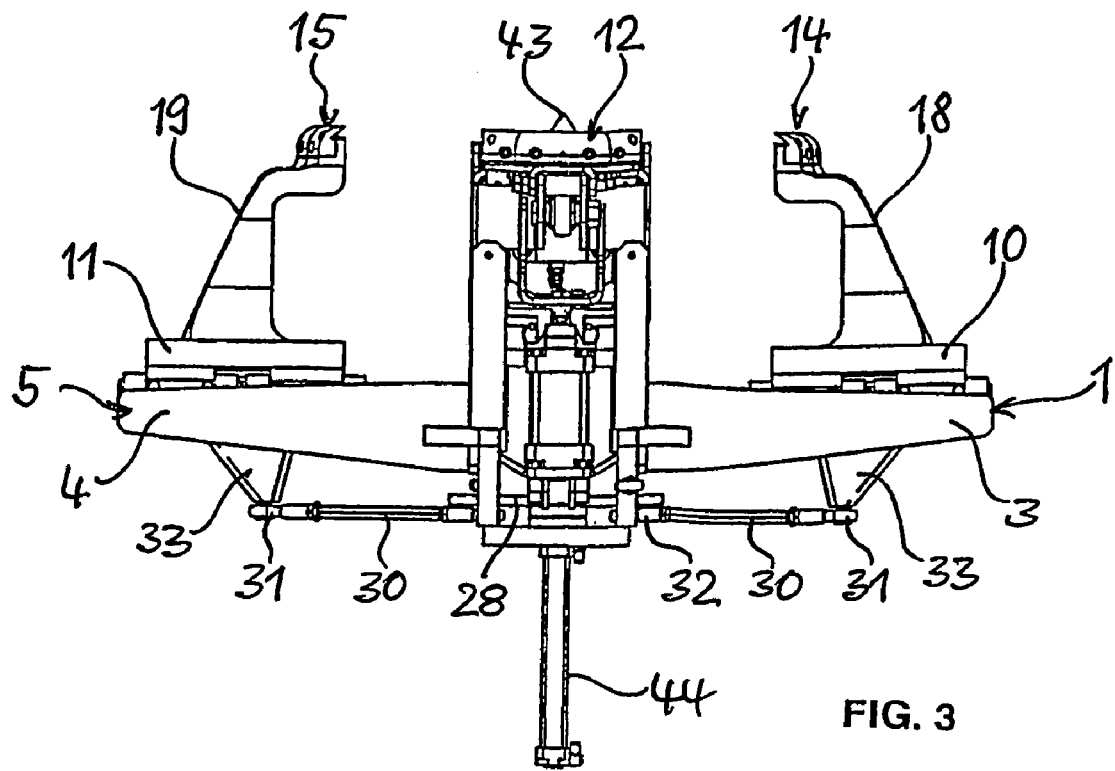
FIG. 3 is a second side view of the clamping device according to FIG. 1.

The clamping device shown in the drawings comprises a cross-shaped carrier 1 having a longitudinal beam 2 and a transverse beam 5, which is formed by two arms 3, 4 attached to the longitudinal beam 2. The longitudinal beam 2 and the transverse beam 5 are arranged at right angles to each other. On the upper side, parallel guide rails 6, 7 are arranged on the longitudinal beam 2 and on the transverse beam 5. Two slides 8, 9 are mounted movably in the direction of the longitudinal axis of the beam 2, on the guide rails 6 of the longitudinal beam 2, by means of interlocking ball tracks. A slide 10 or 11 is mounted movably in the longitudinal direction of the transverse beam 5 on each side of the longitudinal beam 2 on the guide rails 7 of the transverse beam 5, by means of interlocking ball tracks. Each of the slides 8 to 11 carries a clamping jaw 12, 13, 14, 15. The clamping jaws 12, 13 are each supported on the slide 8, 9 by two parallel walls 16, 17 extending in the direction of the guide rails 6. The clamping jaws 14, 15 are attached to the supports 18, 19, which are carried by the slides 10, 11.

The clamping jaws 12 to 15 have shelf faces 20, which are arranged in a common shelf plane situated above the supports 18, 19 and the walls 16, 17, and which are used for depositing the rim of a vehicle wheel in the clamping position. Adjacent to the shelf faces 20, the clamping jaws 12 to 15 comprise clamping claws 21, which may be pressed radially against the edge of a rim and are inclined in such a way that they partially overlap the edge of the rim. The clamping claws 21 have a concavely curved middle portion, to which substantially straight portions are connected on both sides. The curved middle portions are intended for clamping rims of smaller diameters. The straight portions are placed tangentially on rims of greater diameters. On their back, the clamping claws 21 have a curvature, which extends below the shelf plane. A contour, which protects the fitted wheel from damage, is hereby produced. In addition, the radial width of the clamping claws 21 is limited to the minimum required for force transfer, in order to create a free space that is as great as possible for the deformation of the tire when it is being mounted. The axial height of the clamping claws 21 is preferably no greater than that of the rim edge.

A hydraulic or pneumatic cylinder 22 is provided for moving the clamping jaws 12 to 15 and for generating the clamping force capable of holding a vehicle wheel. The cylinder 22 is arranged below the shelf plane and substantially parallel to the longitudinal beam 2. The cylinder comprises a cylinder housing 23 which, by its closed end, is mounted on a shaft 24 connecting the walls 17. The piston rod 25 of the cylinder 22 is attached to a bearing block 26, which is arranged on the back of the walls 16 and is attached to said walls. As a result, a free space remains between the walls 16, into which free space the cylinder housing 23 may dip when the clamping jaws 12, 13 are moved toward each other.

The clamping jaws 14, 15 are moved synchronously with the clamping jaws 12, 13 along the guide rail 7. For this, the movement of the clamping jaws 12, 13 is transferred onto the clamping jaws 14, 15 by means of a gear unit 27 arranged on the underside of the carrier 1. The gear unit 27 comprises a central disc 28, which is mounted rotatably about an axis arranged centrally between the clamping jaws 12 to 15 and perpendicular to the shelf plane. The disc 28 is connected to the slides 8 to 11 by means of four rods 29, 30 of equal lengths and by means of joints 31, 32 arranged on the ends of the rods 29, 30. Each slide 8 to 11 comprises on its underside a downwardly extending support 33, to which a respective rod 29, 30 having the joint 31 is rotatably attached. The rods 29, 30 are attached to the disc 28 by means of the other joint 32, the joints 32 being arranged on the same pitch circle on the disc 28 with spacing of 90° in each case. In order to compensate production inaccuracies, the length of the rods 29, 30 is adjustable.

If the slides 8, 9 together with the clamping jaws 12, 13 are moved toward or away from each other by means of the cylinder 22, this movement is transferred to the disc 28 via the rods 29 and the disc is rotated as a result of this. The rotation of the disc 28 is transferred in an inversely proportional manner by means of the rods 30 to the slides 10, 11 and to the clamping jaws 14, 15 that are carried by the slides, so that said clamping jaws carry out the same movement as the clamping jaws 12, 13 with regard to their path of movement. In addition, the gear unit 27 ensures that the paths of the clamping jaws 12 to 15 are always identical relative to the rotational axis of the disc 28 so that the wheels are centered in relation to the rotational axis when clamped.

A shelf 35, onto which the wheel may be deposited by one side before it is clamped, is provided between the clamping jaws 12, 13. The shelf 35 consists of two parallel flexible belts 36, which are clamped between the clamping jaws 12, 13 at the level of the shelf plane and of which the ends are attached to the ends of the longitudinal beam 2. The belts 36 are guided over first deflecting pulleys 37, which are arranged on mutually facing sides of the clamping jaws 12, 13. The belts 36 are guided from the deflecting pulleys 37 in the direction of the longitudinal beam 2 toward second deflecting pulleys 38. The deflecting pulleys 38 are attached to the walls 16, 17. The belts 36 are guided from the deflecting pulleys 38 to attachment elements 39, on which the ends of the belts are clamped. The attachment elements 39 are held by means of straining screws on rails 40, which are attached to the ends of the longitudinal beam 2. The belts 36 may be clamped by means of the straining screws.

The deflecting pulleys 37, 38 and the attachment elements 39 are arranged in such a way that the belts 36 each extend parallel to the guide rails 6 of the longitudinal beam 2, between the deflecting pulleys 37 and between the attachment elements 39 and the deflecting pulleys 38. If the clamping jaws 12, 13 are moved along the guide rails 6, this has no effect on the clamping of the belts 36. Due to the deflection of the belts 36 a free space for fitting of the tire is created on the back of the clamping jaws 12, 13.

Two parallel guide elements 41, which extend below the belts 36 and support these belts on the longitudinal beam 2, are attached to the longitudinal beam 2 centrally between the clamping jaws 12, 13. A centering bridge 42, which spans the cylinder 22, is movably mounted on the guide elements 41. The centering bridge 42 comprises on its upper side a centering arbor 43, which is arranged coaxially relative to the rotational axis of the disc 28. The centering bridge 42 is connected to a cylinder 44, which is arranged below the gear unit 27 and of which the piston rod extends through the bearing of the disc 28, by means of fork, which is mounted on the guide elements 41. The centering arbor 43 may be moved into the centering bore of a wheel by means of the cylinder 44, in order to keep the wheel in the centered position when the clamping jaws are released after fitting the tire.

The invention claimed is:

1. A device for clamping the rim of a vehicle wheel, having a shelf, on which the rim may be deposited by one side, and having at least two clamping jaws, which are movable radially relative to the rim for clamping the rim bead adjacent to the shelf, wherein the clamping jaws are mounted on a carrier by means of slides guided with minimal friction and are arranged on supports extending from the slides to the shelf located above the carrier, said clamping laws comprising contact faces, which cooperate with the axial outer side of the rim bead, and clamping claws, which may be pressed onto the rim bead radially from the exterior, and wherein a free space extends in the axial and radial direction leading away from the rim, on the back, turned away from the rim bead, of at least one clamping claw.

2. The device according to claim 1, comprising two pairs of clamping jaws, of which the paths of movement intersect, and wherein a drive, which synchronously moves the clamping jaws into a clamping position pressed against the rim of the vehicle wheel, is provided.

3. The device according to claim 2, wherein the clamping jaws comprise clamping faces which may be pressed against the rim at two mutually spaced points.

4. The device according to claim 1, wherein the carrier is cross-shaped.

5. The device according to claim 1, wherein the drive comprises a gear unit having a rotatable disc, of which the rotational axis extends in the center of the paths of movement of the clamping jaws and at right angles to the paths of movement, each clamping jaw being connected to the disc in a movement-transferring manner by a rod, the rod being attached to the clamping jaws and the disc by means of joints.

6. The device according to claim 1, wherein the clamping jaws comprise a clamping claw, which overlaps the rim bead, and a shelf face, which is situated in the plane of the support.

7. The device according to claim 1, wherein a hydraulic or pneumatic cylinder of which the cylinder housing is connected to the support of one clamping jaw and of which the piston rod is connected to the support of the other clamping jaw is arranged below the shelf plane between the supports of two opposing clamping jaws.

8. A device for clamping the rim of a vehicle wheel, having a shelf, on which the rim may be deposited by one side, and having at least two clamping jaws, which are movable radially via a drive relative to the rim for clamping the rim bead adjacent to the shelf, wherein the clamping jaws comprise contact faces, which cooperate with the axial outer side of the rim bead, and clamping claws, which may be pressed onto the rim bead radially from the exterior, wherein a free space extends in the axial and radial direction leading away from the rim, on the back, turned away from the rim bead, of at least one clamping claw; and wherein the drive comprises a gear unit having a rotatable disc with a rotational axis extending in the center of the paths of movement of the clamping jaws and at right angles to the paths of movement, each clamping jaw being connected to the disc in a movement-transferring manner by a rod with an adjustable length, the rod being attached to the clamping jaws and the disc by means of joints.

9. A device for clamping the rim of a vehicle wheel, having a shelf, on which the rim may be deposited by one side, and having at least two clamping jaws, which are movable radially relative to the rim for clamping the rim bead adjacent to the shelf, wherein the clamping jaws are mounted on a carrier by means of slides guided with minimal friction, said clamping jaws comprising contact faces, which cooperate with the axial outer side of the rim bead, and clamping claws, which may be pressed onto the rim bead radially from the exterior, wherein a free space extends in the axial and radial direction leading away from the rim, on the back, turned away from the rim bead, of at least one clamping claw, and wherein the shelf is arranged between the clamping jaws and comprises at least two mutually spaced, parallel flexible belts guided on the at least two clamping jaws via deflecting pulleys and attached to the cross-shaped carrier by their ends.

10. The device according to claim 9 wherein the flexible belts are guided over first deflecting pulleys arranged before the clamping jaws and are deflected thereon in the direction of the cross-shaped carrier and are then guided over second deflecting pulleys arranged between the shelf plane and the cross-shaped carrier and are deflected thereby into a plane, which is parallel to the shelf plane and contains the points for attaching the belts to the cross-shaped carriers.

11. The device according to claim 9, wherein supports, on which the belts rest, are arranged on the carrier centrally between the clamping jaws.

12. A device for clamping the rim of a vehicle wheel, having a shelf, on which the rim may be deposited by one side, and having at least two clamping jaws, which are movable radially relative to the rim for clamping the rim bead adjacent to the shelf, wherein the clamping jaws comprise contact faces, which cooperate with the axial outer side of the rim bead, and clamping claws, which may be pressed onto the rim bead radially from the exterior, wherein a centering arbor, which is movable perpendicularly to the shelf plane, is arranged centrally between the clamping jaws, and wherein a free space extends in the axial and radial direction leading away from the rim, on the back, turned away from the rim bead, of at least one clamping claw.

* * * * *